US012559400B2

(12) United States Patent
Muck

(10) Patent No.: US 12,559,400 B2
(45) Date of Patent: *Feb. 24, 2026

(54) METHOD FOR TREATING WATERS, SEDIMENTS AND/OR SLUDGES

(71) Applicant: OASE GmbH, Hörstel-Riesenbeck (DE)

(72) Inventor: Thorsten Muck, Ibbenburen (DE)

(73) Assignee: OASE GmbH, Horstel-Riesenbeck (DE)

( * ) Notice: Subject to any disclaimer, the term of this patent is extended or adjusted under 35 U.S.C. 154(b) by 719 days.

This patent is subject to a terminal disclaimer.

(21) Appl. No.: 17/792,660

(22) PCT Filed: Dec. 18, 2020

(86) PCT No.: PCT/EP2020/087301
§ 371 (c)(1),
(2) Date: Jul. 13, 2022

(87) PCT Pub. No.: WO2021/144121
PCT Pub. Date: Jul. 22, 2021

(65) Prior Publication Data
US 2023/0050281 A1 Feb. 16, 2023

(30) Foreign Application Priority Data
Jan. 13, 2020 (EP) ..................................... 20151430

(51) Int. Cl.
*C02F 3/34* (2023.01)
*C02F 1/72* (2023.01)
(Continued)

(52) U.S. Cl.
CPC .............. *C02F 3/341* (2013.01); *C02F 1/722* (2013.01); *C02F 3/345* (2013.01); *C02F 11/004* (2013.01);
(Continued)

(58) Field of Classification Search
CPC .......... C02F 3/341; C02F 1/722; C02F 3/345; C02F 11/004; C02F 11/02; C02F 11/145;
(Continued)

(56) References Cited

U.S. PATENT DOCUMENTS 6,569,342 B1 * 5/2003 Willuweit ................. C05B 1/00
71/901
9,174,846 B2 11/2015 Beck et al.
(Continued)

FOREIGN PATENT DOCUMENTS

CN 1301237 A 6/2001
CN 102695760 A 9/2012
(Continued)

OTHER PUBLICATIONS

Sulu-Gambari et al. "Cable Bacteria Control Iron-Phosporous Dynamics in Sediments of a Coastal Hypoxic Basin." Env. Sci. Tech., vol. 50, pp. 1227-1233 (Year: 2016).*
(Continued)

*Primary Examiner* — Madeline Gonzalez
(74) *Attorney, Agent, or Firm* — Jenkins, Taylor & Hunt, P.A.

(57) ABSTRACT

The present invention relates to methods for treating waters, sediments and/or sludges using alkaline earth metal peroxide, especially calcium peroxide, and cable bacteria, to a kit comprising a composition comprising at least one alkaline earth metal peroxide, and cable bacteria, and to uses of a composition comprising at least one alkaline earth metal peroxide, especially in combination with cable bacteria.

20 Claims, 1 Drawing Sheet

(51) Int. Cl.

| | |
|---|---|
| *C02F 11/00* | (2006.01) |
| *C02F 11/02* | (2006.01) |
| *C02F 11/145* | (2019.01) |
| *C02F 101/10* | (2006.01) |
| *C02F 103/00* | (2006.01) |

(52) U.S. Cl.
CPC ............ *C02F 11/02* (2013.01); *C02F 11/145* (2019.01); *C02F 2101/101* (2013.01); *C02F 2103/007* (2013.01)

(58) Field of Classification Search
CPC .......... C02F 2101/101; C02F 2103/007; C02F 2101/30; C02F 2303/06; C02F 2101/105; C02F 2305/06; Y02W 10/20
USPC .................................................. 210/631, 601
See application file for complete search history.

(56) References Cited

U.S. PATENT DOCUMENTS

| | | | |
|---|---|---|---|
| 11,834,355 | B2 | 12/2023 | Wilfert et al. |
| 2003/0189187 | A1 | 10/2003 | Hollabaugh et al. |
| 2023/0033717 | A1 | 2/2023 | Muck |

FOREIGN PATENT DOCUMENTS

| | | | |
|---|---|---|---|
| CN | 109456894 | A | 3/2019 |
| CN | 110691758 | A | 1/2020 |
| CN | 112279478 | A | 1/2021 |
| CN | 115244012 | A | 10/2022 |
| CN | 115611380 | A | 1/2023 |
| DE | 19851345 | | 5/2000 |
| EP | 4122895 | A1 | 1/2023 |
| WO | WO 95/18070 | | 7/1995 |
| WO | WO 99/58457 | | 11/1999 |
| WO | WO 01/50863 | A1 | 7/2001 |
| WO | WO 2018/169395 | A1 | 9/2018 |
| WO | WO2021/144121 | A1 | 7/2021 |

OTHER PUBLICATIONS

International Preliminary Report on Patentability Corresponding to International Patent Application No. PCT/EP2020/087301 dated Jul. 19, 2022 (English translation).
International Search Report Corresponding to International Patent Application No. PCT/EP2020/087301 dated Mar. 19, 2021.
Kjeldsen et al., "On the evolution and physiology of cable bacteria." PNAS, vol. 116(38), pp. 19116-19125 (2019).
Muller et al., "Groundwater cable bacteria conserve energy by sulfur disproportionation." ISME J., vol. 14, pp. 623-634 (2019).

Sulu-Gambari et al., "Cable Bacteria Control Iron-Phosphorous Dynamics in Sediments of a Coastal Hypoxic Basin." Env. Sci. Tech., vol. 50, pp. 1227-1233 (2016).
Written Opinion of the International Searching Authority Corresponding to International Patent Application No. PCT/EP2020/087301 dated Mar. 19, 2021 (English translation).
Office Action (Restriction Requirement) corresponding to U.S. Appl. No. 17/864,154 dated Sep. 18, 2023.
Sulu-Gambari, F., et al., "Phosphorus Cycling and Burial in Sediments of a Seasonally Hypoxic Marine Basin", Estuaries and Coasts (2018), vol. 41, 2018, pp. 921-939.
Scholz, V.V., et al., "The rhizosphere of aquatic plants is a habitat for cable bacteria", FEMS Microbiology Ecology, vol. 95, No. 6, May 4, 2019, 9 pages.
Non-Final Office Action dated Dec. 19, 2023 in U.S. Appl. No. 17/864,154, 10 pages.
Office Action received in Chinese Patent Application No. 202080098421.6, mailed on Dec. 22, 2023, 13 pages. (Translation).
Office Action and Search report received in Chinese Patent Application No. 202210826847.X mailed on May 9, 2024, 18 pages. (Translation).
European Search Report corresponding to European Patent Application No. 22184456.6-1101 dated Jan. 3, 2023 [Machine Translation].
Heinrich et al., "Transformation of redox-sensitive to redox-stable iron-bound phosphorus in anoxic lake sediments under laboratory conditions." Water Res., vol. 189, Article No. 116609 (2021).
Hermans et al., "Coupled dynamics of iron, manganese and phosphorus in brackish coastal sediments populated by cable bacteria." Liminol. Oceanogr., vol. 66, pp. 2611-2631 (2021).
Hermans et al., "Biogeochemical impact of cable bacteria on coastal Black Sea sediment," Biogeosciences, 17, pp. 5919-5938 (2020).
Prot et al., "Magnetic separation and characterization of vivianite from digested sewage sludge." Sep. Pur. Tech., vol. 224, pp. 564-579 (2019).
Wang et al., "Fe(III) reduction and vivianite formation in activated sludge," Separation and Purification Technology, 220, pp. 126-135 (2019).
Yuan et al., "Biosynthesis of vivianite from microbial extracellular electron transfer and environmental application," Science of the Total Environment, 762, 143076, pp. 1-13 (2021).
Intention to grant of a European patent corresponding to European Patent Application No. 22184456.6-1014 dated Dec. 20, 2024, pp. 16 (Translation).
Non-Final Office action for U.S. Appl. No. 17/864,154, dated Nov. 29, 2024, 13 pages.
Office Action (Notice of Allowance) corresponding to U.S. Appl. No. 17/864,154 dated Mar. 28, 2025.
Office Action and Search Report received in Chinese Patent Application No. 202080098421.6, mailed on Aug. 12, 2024, pp. 20 (Translation).
Office Action corresponding to U.S. Appl. No. 17/864,154 dated Jun. 3, 2024, pp. 14.

* cited by examiner

METHOD FOR TREATING WATERS, SEDIMENTS AND/OR SLUDGES

TECHNICAL FIELD

The present invention relates to methods for treating waters, sediments and/or sludges using alkaline earth metal peroxide, especially calcium peroxide, and cable bacteria, to a kit comprising a composition comprising at least one alkaline earth metal peroxide, and cable bacteria, and to uses of a composition comprising at least one alkaline earth metal peroxide, especially in combination with cable bacteria.

BACKGROUND

In lakes and waterbodies, a consequence of high phosphorus pollution (eutrophication) is the accelerated formation of sludge composed of particulate organic matter (POM) such as dead algae and plant parts that are not fully mineralized.

The accumulation of organic matter causes severe oxygen depletion. Up to the upper edge of the layer of sediment, the overlying water is also already free of oxygen. In the underlying layers of sediment, the organic matter is anaerobically mineralized, with other substrates which are inorganic and oxidized serving as electron acceptor. The microorganisms able to utilize the electron acceptor with the highest redox potential dominate in accordance with the principle of competition. Under these circumstances, what takes place is the sequential reduction in the order of nitrate, manganese (IV) oxide, iron (III) oxide and sulfate. In the absence of these substrates, organic matter is degraded by acetogenesis and methanogenesis.

The layer of water above the upper edge of sediment that is already free of oxygen virtually shields the microorganisms that can use oxygen. This unnaturally shortens the cycles of matter. The shortening of mineralization in waterbodies is part of the "vicious circle" of eutrophication.

Owing to the increasing accumulation of sludge, the water volume in the waterbody decreases, and not only do the habitats become smaller physically, but the habitat for fish, macrozoobenthos and plankton is also reduced because of the chemical/physical consequences. The numbers of species decrease, as does the density of organisms. The sulfide formed in the sediment is moreover phytotoxic, meaning that aquatic plants are also no longer able to develop.

The accumulation of sludge in waterbodies is a global problem and leads to various use restrictions and to increased release of climate-damaging methane from sediments in waterbodies.

As a result of these occurrences and consequences of eutrophication, the lakes and waterbodies can be destroyed, making treatment thereof necessary.

For example, EP 1080042 A1 discloses the use of calcium peroxide ($CaO_2$) for treatment of sludge. It described especially the binding of o-phosphate and heavy metals and the increase in the enzyme activity of bacteria.

One of the advantages of calcium peroxide is that the hydrolysis can last about 7-8 weeks, during which molecular oxygen is uniformly released into the environment, which can be used by heterotrophic bacteria in situ for degradation of organic matter. The organic mass convertible thereby is in a quantitative ratio to the mass of oxygen released. Whereas the oxygen availability is calculable from the mass of calcium peroxide (Eq. 1), the oxygen requirement for mineralization of the "average biomass composition" [Uhlmann & Horn 2001] can also be determined according to Eq. 2.

$$CaO_2 + 2H_2O \rightarrow 2Ca(OH)_2 + O_2 \qquad (Eq.\ 1)$$

$$C_{106}H_{180}O_{45}N_{16}P + 118.502 \rightarrow 106CO_2 + 66H_2O + 16NH_3 + PO_4^{3-} + Energy \qquad (Eq.\ 2)$$

Accordingly, 1.56 g of oxygen per gram of organic matter are required for mineralization. In order to oxidize 1% of the dry residue of a sludge containing dry residue of, for example, 0.045 $g/cm^3$ to a depth of 1 cm, 7.0 g of oxygen are required per square meter. This requires application of 49 g of pure calcium peroxide per $m^2$.

In the case of waterbodies containing a strong accumulation of sludge with, for example, an organic fraction of between 10% and 40% of the dry matter, considerable application rates must therefore be used.

In the case of high thicknesses of sludge, the calcium peroxide is moreover usually applied as a suspension to the sediment using lances in order to achieve an effect within the layer.

This is associated with huge effort in the case of large sediment surfaces, since the calcium peroxide is not water-soluble and, in addition, good distribution requires at least one injection per $m^2$ of surface.

It has been found to be beneficial to add heterotrophic microorganisms to the $CaO_2$ to allow rapid use of the released oxygen within the short period of activity of 8 weeks. These microorganisms are active directly at the interface between the $CaO_2$ and the sediment. This means that an active surface is formed which, in the case of applications without any injection, is subjected to an upper limit by the $CaO_2$ layer. Released oxygen is also released to the waterbody, since free diffusion is possible in this direction.

There is thus a need for methods for improved treatment of waterbodies, sediments and sludges having a high sludge content and/or suboxic or even anoxic regions.

SUMMARY

It was found that, surprisingly, the effectiveness of the application of $CaO_2$ can be increased dramatically if the application is designed in such a way that an environment is formed in which the so-called cable bacteria are established.

In a first aspect, the present invention provides a method for treating waters, such as standing and flowing waters and wastewaters; sediments and/or sludges, especially sediments and/or sludges in waterbodies, comprising:
  (a) introducing and/or applying a composition comprising at least one alkaline earth metal peroxide into and/or to the waters, sediments and/or sludges; and
  (b) introducing cable bacteria into the waters, sediments and/or sludges.

In a second aspect, there is disclosed a method for treating waters, sediments and/or sludges, especially sediments and/or sludges in waterbodies, comprising:
  (i) testing the waters, sediments and/or sludges for the presence of cable bacteria; and
  (ii-a) introducing and/or applying a composition comprising at least one alkaline earth metal peroxide into and/or to the waters, sediments and/or sludges, and introducing cable bacteria into the waters, sediments and/or sludges if no or essentially no cable bacteria were found during the testing of the waters, sediments and/or sludges; or
  (ii-b) introducing and/or applying a composition comprising at least one alkaline earth metal peroxide into and/or to the waters, sediments and/or sludges if cable bacteria were found during the testing of the waters, sediments and/or sludges.

In certain embodiments with a low density of cable bacteria (e.g., $<10^1$ cells/cm$^2$), a small dose of calcium peroxide can first be applied, in order to develop an in situ preliminary culture, before a second application is carried out, for example 2 months later at the earliest.

The present invention also provides a kit comprising a composition comprising at least one alkaline earth metal peroxide, and cable bacteria, and also the use of a composition comprising at least one alkaline earth metal peroxide in combination with cable bacteria for treatment of waters, sediments and/or sludges, especially sediments and/or sludges in waterbodies.

Also disclosed are the use of a composition comprising at least one alkaline earth metal peroxide in combination with cable bacteria for promotion of the development of aquatic plants, the use of a composition comprising at least one alkaline earth metal peroxide in combination with cable bacteria for waterbody restoration, the use of a composition comprising at least one alkaline earth metal peroxide in combination with cable bacteria for sludge degradation and restoration of water reservoir capacity, and the use of a composition comprising at least one alkaline earth metal peroxide in combination with cable bacteria for detoxification of a biocenosis in a sediment and/or in sludge, and also the use of alkaline earth metal peroxide, especially calcium peroxide, or mixtures comprising alkaline earth metal peroxide, especially calcium peroxide, as a solid electron acceptor for temporary establishment of a sediment biocenosis including cable bacteria, for example as occurs in undisturbed waterbodies.

Advantageous embodiments and developments will become apparent from the further dependent claims and from the description with reference to the figures.

BRIEF DESCRIPTION OF THE DRAWINGS

The accompanying figures are intended to provide a further understanding of the embodiments of the invention. They illustrate embodiments and, together with the description, serve to explain principles and concepts of the invention. Other embodiments and many of the stated advantages will become apparent with reference to the drawings. The elements of the drawings are not necessarily shown true to scale in relation to one another.

In the figures of the drawing, elements, features and components that are identical, are functionally identical and act identically are—unless stated otherwise—each provided with the same reference signs.

DETAILED DESCRIPTION

Definitions

Figure 1:
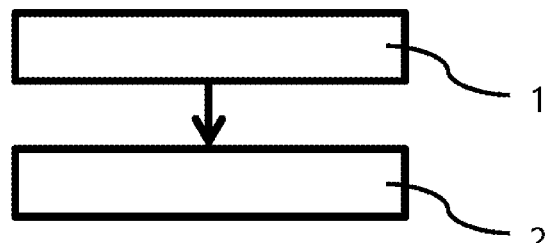
FIG. 1 schematically shows an exemplary method according to the invention as per the first aspect.

First of all, in the context of the present patent application, the following terms are to be understood as follows:

Unless otherwise defined, technical and scientific expressions used herein have the same meaning as commonly understood by a person skilled in the art in the technical field of the invention.

Cable bacteria are multicellular bacteria which are joined together in the form of a chain and thus form long aggregates in the form of a cable that allow electron transport over centimeter distances. They belong to the deltaproteobacterial family Desulfobulbaceae, which are known to comprise sulfate-reducing or sulfur-disproportionating species. Based on their 16S rRNA, cable bacteria currently form two genera, "Candidatus Electrothrix" and "Cancidatus Electronema". With an "anodic end" deep in the sediment and a "cathodic end" at the phase boundary with electron acceptors, they can bridge suboxic zones and oxidize, for example, sulfide to sulfate in the anoxic zone. At the "cathodic end" (acting as a cathode), oxygen is reduced, for example, and this leads to an increase in pH there. Here, the cable bacteria allow electron transport over long distances. Significantly, these cable bacteria are usually insufficiently stable to grow out of the sediment surface in order to reach the oxygen dissolved in the water. Accordingly, cable bacteria cannot work in the strongly reducing sediments of eutrophic waterbodies. Owing to their electron transport, they spatially bridge the occurrence of substrate and electron acceptor. This means that they are clearly superior to other organisms which can only metabolize directly at the boundary layer of redox potentials.

Cable bacteria cannot therefore naturally "work" in the waterbodies containing accumulated sludge due to eutrophication, since the oxygen there, as electron acceptor, does not enter the upper sediment layer. With the aid of calcium peroxide, these generally natural organisms can eliminate the known principle of competition which is based on whatever are the highest redox potentials of the particular electron acceptors; cable bacteria directly connect with whatever is the highest redox potential available and thus avoid microbiological competition with microorganisms limited to metabolism at/in the phase boundary.

The oxidation of sulfide eliminates its phytotoxic effect and thus enables underwater aquatic plants to settle and grow. The loss of macrophyte vegetation in waterbodies is namely a known and unwelcome consequence of eutrophication.

Another advantage of cable bacteria is that they are mobile and can orient themselves, for example in sludges and/or sediments and even on particles, in order to be able to carry out a redox reaction in different environments.

Cable bacteria are, for example, described in K. U. Kjeldsen et al, "On the evolution and physiology of cable bacteria", PNAS, 2019, www.pnas.org/cgi/doifl073/pnas.1903514116, and reference is made to this article with regard to cable bacteria and the content of said article with regard to cable bacteria is hereby incorporated by reference.

In the context of the present invention, waters are understood to mean all waters or waterbodies, such as ponds, lakes, rivers, reservoirs, coastal waters, fjords, brackish water lakes, bays, seawater, breeding stations for fish and other marine animals, water in reservoir systems for agriculture or drinking water reservoirs and aquifers, it also being possible for the above waters to contain soils, sediments and/or sludges and also deposited and suspended matter. In the context of the present invention, sediments are understood to mean solid bodies present in waters, for example in ponds, lakes and rivers. The sludges can, for example, come from sewage treatment plants, wastewater filters, etc., and/or be present at the bottom of waters. Preferred waters are fresh waters containing sediments and/or sludge deposits, for instance ponds, lakes, etc., which have suboxic and/or anoxic zones and can be destroyed rapidly, but which can be treated effectively with the present methods.

Specified amounts in the context of the present invention are based on % by weight, unless stated otherwise or apparent from the context.

In a first aspect, the present invention provides a method for treating waters, such as standing and flowing waters and wastewaters; sediments and/or sludges, especially sediments and/or sludges in waterbodies, comprising:

(a) introducing and/or applying a composition comprising at least one alkaline earth metal peroxide into and/or to the waters, sediments and/or sludges; and (b) introducing cable bacteria into the waters, sediments and/or sludges.

In a second aspect, the present invention is directed to a method for treating waters, sediments and/or sludges, especially sediments and/or sludges in waterbodies, comprising:

(i) testing the waters, sediments and/or sludges for the presence of cable bacteria; and (ii-a) introducing and/or applying a composition comprising at least one alkaline earth metal peroxide into and/or to the waters, sediments and/or sludges, and introducing cable bacteria into the waters, sediments and/or sludges if no or essentially no cable bacteria were found during the testing of the waters, sediments and/or sludges; or (ii-b) introducing and/or applying a composition comprising at least one alkaline earth metal peroxide into and/or to the waters, sediments and/or sludges if cable bacteria were found during the testing of the waters, sediments and/or sludges.

In the second-aspect method, in certain embodiments with a low density of cable bacteria (e.g., $<10^1$ cells/cm$^2$ or $<100$ cells/m$^2$), a small dose of calcium peroxide can first be applied, in order to develop an in situ preliminary culture, before a second application is carried out, for example 2 months, 3 months or 4 months later at the earliest.

In the first-aspect method and the second-aspect method, the composition comprising at least one alkaline earth metal peroxide and the cable bacteria are the same.

The introduction of the cable bacteria is not subject to any particular limitation. For example, they can be introduced as a suspension with water as the solvent. Since the cable bacteria are able to propagate very efficiently, especially under sufficient substrate conditions ($O_2/S^{2-}$), the concentrations required for effective inoculation are not very high; for example, using $10^2$ to $10^5$ cells/ml, a few liters of a relevant preliminary culture, for example 2, 3, 4, 5, 6, 7, 8, 9 or 10 liters or higher, already suffice for 1 ha of water surface. Higher starting concentrations or amounts shorten the establishment time. The cable bacteria are likewise not subject to any particular limitation and can, for example, be tailored to the type of waterbody. For example, they can be provided from a preliminary culture, which can be cultivated in the laboratory or in the field, on a partial area or the entire area of the waterbody.

In the first-aspect method, steps (a) and (b) can be carried out independently of one another or simultaneously, and step (a) can be carried out before or after step (b). However, in certain embodiments, step (b) to introduce cable bacteria is carried out before step (a), so that the cable bacteria can immediately start utilizing the oxygen released by the at least one alkaline earth metal peroxide, especially calcium peroxide, and/or other electron acceptors provided thereby, for example the alkaline earth metal peroxide itself, for example calcium peroxide. Here, a time interval between steps (b) and (a) is not subject to any particular limitation, but can, for example, be up to one week, preferably up to 3 days, 2 days, 1 day or less, for example 12 h or less or 8 h or less. In certain embodiments, step (a) is carried out before step (b), so that oxygen released from the at least one alkaline earth metal peroxide, especially calcium peroxide, and/or other electron acceptors provided thereby, for example the alkaline earth metal peroxide itself, for example calcium peroxide, are already available for the cable bacteria. Here, a time interval between steps (a) and (b) is not subject to any particular limitation, but can, for example, be up to one week, preferably up to 3 days, 2 days, 1 day or less, for example 12 h or less or 8 h or less.

Cable bacteria prefer a more pH-neutral environment. Since the pH in the uppermost layer can rise temporarily immediately after the application of calcium peroxide, the pH at the sediment phase boundary is preferably monitored until it has normalized to values between 8.7 and 7.4, for example before cable bacteria are introduced.

Calcium peroxide can be processed as a product in, for example as above, compositions such that an increased pH is not to be expected during introduction, and this is advantageous for the practical implementation of the invention.

However, the composition comprising at least one alkaline earth metal peroxide and the cable bacteria are preferably introduced into the waters, sediments and/or sludges at substantially the same points or at the same point in order to minimize diffusion processes and to increase the efficiency of the treatment. What becomes apparent here is especially the synergism between the oxygen release by the at least one alkaline earth metal peroxide, especially calcium peroxide, and/or other electron acceptors derived from alkaline earth metal peroxide, for example calcium peroxide, and the use thereof by the cable bacteria, which synergism is described in more detail above and below.

In certain embodiments, the cable bacteria are introduced in such a way that they can accumulate on matter to be degraded, such as sludge in a waterbody, deposits, sludges in general, sediments, etc., and thus allow contacting between suboxic and/or anoxic regions of the matter to be degraded and the oxygen released by the at least one alkaline earth metal peroxide, especially calcium peroxide, and/or some other solid electron acceptor derived therefrom, for example the alkaline earth metal peroxide itself, for example $CaO_2$.

In step (ii-a) as well of the second-aspect method, the introduction and/or application of a composition comprising at least one alkaline earth metal peroxide into and/or to the waters, sediments and/or sludges and the introduction of cable bacteria into the waters, sediments and/or sludges can be done simultaneously or in a staggered manner if no or essentially no cable bacteria were found during the testing of the waters, sediments and/or sludges.

However, in certain embodiments, the step to introduce cable bacteria is carried out before the step to introduce and/or apply the composition comprising the at least one alkaline earth metal peroxide, especially calcium peroxide, so that the cable bacteria can immediately start utilizing the oxygen released by the at least one alkaline earth metal peroxide, especially calcium peroxide, and/or other electron acceptors provided thereby, for example the alkaline earth metal peroxide itself, for example calcium peroxide. Here, a time interval between the two steps (e.g., introduction of the cable bacteria before the introduction and/or application of the composition comprising the at least one alkaline earth metal peroxide, especially calcium peroxide) is also not subject to any particular limitation, but can, for example, be up to one week, preferably up to 3 days, 2 days, 1 day or less, for example 12 h or less or 8 h or less. In certain embodiments, the step to introduce and/or apply the composition comprising the at least one alkaline earth metal peroxide, especially calcium peroxide, is carried out before the step to introduce the cable bacteria, so that oxygen released from the at least one alkaline earth metal peroxide, especially calcium peroxide, and/or other electron acceptors provided thereby, for example the alkaline earth metal peroxide itself, for example calcium peroxide, are already available for the cable bacteria. Here, a time interval between the two steps (e.g., application and/or introduction of the composition comprising the at least one alkaline earth metal peroxide, especially calcium peroxide, before the cable bacteria) is not subject to any particular limitation, but can, for example, be up to one week, preferably up to 3 days, 2 days, 1 day or less, for example 12 h or less or 8 h or less.

However, the composition comprising at least one alkaline earth metal peroxide and the cable bacteria are preferably introduced into the waters, sediments and/or sludges at substantially the same points or at the same point in order to minimize diffusion processes and to increase the efficiency of the treatment. What becomes apparent here is especially the synergism between the oxygen release by the at least one alkaline earth metal peroxide, especially calcium peroxide, and/or other electron acceptors provided thereby, for example the alkaline earth metal peroxide itself, for example calcium peroxide, and the use thereof by the cable bacteria, which synergism is described in more detail above and below.

In certain embodiments, the cable bacteria are introduced in such a way that they can accumulate on matter to be degraded, such as sludge in a waterbody, deposits, sludges in general, sediments, particles, etc., and thus allow contacting between suboxic and/or anoxic regions of the matter to be degraded and the oxygen released by the at least one alkaline earth metal peroxide, especially calcium peroxide, and/or other electron acceptors provided thereby, for example the alkaline earth metal peroxide itself, for example calcium peroxide.

The introduction and/or application of the composition comprising the at least one alkaline earth metal peroxide, especially calcium peroxide, is not subject to any particular limitation. In certain embodiments, the composition comprising at least one alkaline earth metal peroxide is introduced into the water, the sludge and/or the sediment and/or applied to the water, the sludge and/or the sediment directly, in solid form or as an aqueous slurry or solution, by hand or by suitable metering systems. This is simple to carry out and allows distribution, such that approximately identical concentrations of alkaline earth metal peroxide, especially calcium peroxide, are available within the waters, on the sludge and/or on the sediment—even over long periods of time—and can ensure optimal functioning of the cable bacteria.

In certain preferred embodiments, the composition comprising at least one alkaline earth metal peroxide comprises only one alkaline earth metal peroxide, especially calcium peroxide. In certain embodiments, more than one alkaline earth metal peroxide can be present in the composition.

In certain embodiments, the composition comprising at least one alkaline earth metal peroxide is present in solid form and the water to be treated flows around it. As a result, the at least one alkaline earth metal peroxide, especially calcium peroxide, can release oxygen uniformly over long periods of time, meaning that relatively long introduction intervals are possible.

In certain embodiments, the composition comprising at least one alkaline earth metal peroxide is incorporated into the sediment and/or the sludge by positive mixers, rotary tillers or other mechanical metering systems and/or methods. As a result, the sediment and/or the sludge can be loosened and the surface thereof can be enlarged for docking of cable bacteria, thereby making effective degradation possible.

In the second-aspect method, the testing of the waters, sediments and/or sludges for the presence of cable bacteria is not subject to any particular limitation, but is carried out before whichever is the introduction and/or application step, since it differs according to the test results, and so the test results are usually waited for. The testing can, for example, be carried out by collection of a sample comprising solids, for example suspended matter, sludges and sediments, and microbiological testing of the sample for cable bacteria, for example by testing using cable bacteria-specific labels, for example using optical methods as in the case of FISH (fluorescence in situ hybridization), by gene sequencing of genes or genomes present in the sample, etc. The microbiological testing is not subject to any particular limitation and can, for example, also comprise various preparation steps such as purification and/or concentration steps.

If, in the second-aspect method, cable bacteria are found in a sample, it is no longer necessary for cable bacteria to be introduced, and so step (ii-b) is carried out. However, if essentially no cable bacteria, for example $<10^1$ cells/cm$^2$ or $<100$ cells/m$^2$, or no cable bacteria are found, they must also be introduced and step (ii-a) is carried out.

Figure 2:
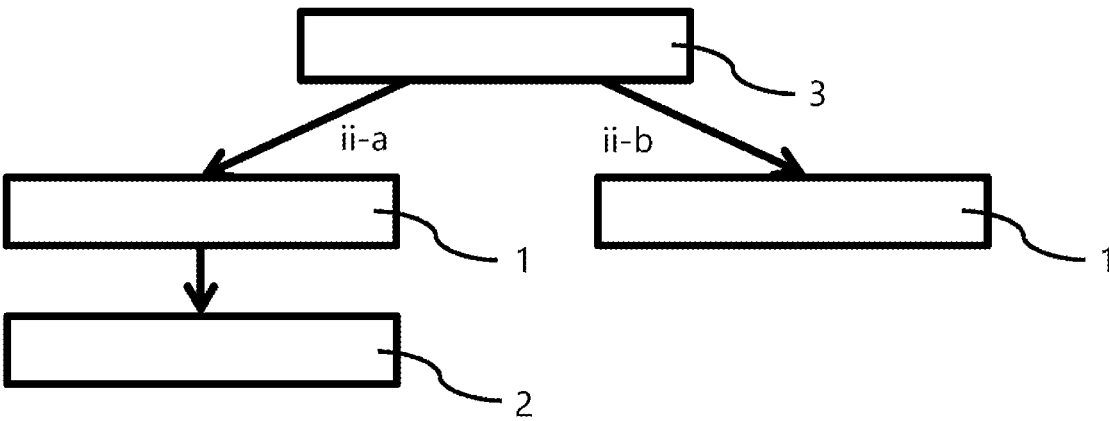
FIG. 2 schematically shows an exemplary method according to the invention as per the second aspect.

In FIGS. 1 and 2, the first-aspect method and the second-aspect method are compared schematically.

In the first-aspect method, which is shown schematically in FIG. 1, no preliminary testing is done here, meaning that rapid action is possible. However, there is also the possibility of introducing cable bacteria, despite their presence, for better exploitation of the applied amount of CaO$_2$ within the period of activity. In the case of waters, sediments and/or sludges having suboxic or especially anoxic regions, such rapid action may, however, be desirable, for example. As shown in FIG. 1 by way of example, the composition comprising the at least one alkaline earth metal peroxide, especially calcium peroxide, is first introduced and/or applied in step 1, and the cable bacteria are then introduced in step 2. It is self-evident that the steps can also be reversed or be carried out simultaneously, for example the composition comprising the at least one alkaline earth metal peroxide, especially calcium peroxide, can thus also comprise the cable bacteria (both in the first-aspect method and the second-aspect method for step ii-a).

In the second-aspect method shown schematically in FIG. 2, testing of the waters, sediments and/or sludges for the presence of cable bacteria is first carried out in step 3. In the event of the absence or low presence of cable bacteria in the sample tested, step (ii-a) is carried out, involving here, as in FIG. 1, the introduction and/or application of the composition comprising the at least one alkaline earth metal peroxide, especially calcium peroxide, in step 1 and the introduction of the cable bacteria in step 2, it also being possible here for the steps to be reversed or to be carried out simultaneously.

However, if cable bacteria are present, especially in a sufficient concentration, for example $\geq 10^1$ cells/cm$^2$ or $\geq 100$ cells/m$^2$, introduction of the composition comprising the at least one alkaline earth metal peroxide, especially calcium peroxide, is carried out only in step 1, and cable bacteria are not introduced here.

Suitable alkaline earth metal peroxides are, for example, the peroxides of magnesium and calcium, and mixtures thereof, preference being given to using peroxides of calcium and magnesium or mixtures thereof. Particular preference is given to calcium peroxides, it being possible for calcium to be replaced by magnesium in proportions of 0.02% by weight to 50% by weight, preferably up to 30% by weight, based on $CaO_2$. Especial preference is given to calcium peroxide which can release oxygen over long periods of time. In commercially available products, the alkaline earth metal peroxide is usually present in a mixture with the corresponding carbonate and hydroxide.

In certain embodiments, the composition comprising at least one alkaline earth metal peroxide additionally comprises at least one alkaline earth metal carbonate and/or at least one alkaline earth metal hydroxide and/or one alkaline earth metal sulfate. For example, calcium carbonate, calcium hydroxide and/or magnesium sulfate can be present in addition to calcium peroxide. Examples of compositions containing such constituents are, for example, IXPER® 75C from Solvay. Examples of suitable compositions comprising alkaline earth metal peroxide are additionally SchlixX® and SchlixX® plus from Söll GmbH.

In certain embodiments, the at least one alkaline earth metal peroxide is used in a mixture with alkali metal carbonate peroxyhydrate. When used in water at a dose of 5-20 g/m3, alkali metal carbonate peroxyhydrates are known to have an effect of directly increasing oxygen, in which a biocidal effect does not yet occur. The alkali metal carbonate peroxyhydrates are addition products of alkali metal carbonates with $H_2O_2$, such as $Me_2CO_3 \times H_2O_2$, for example 2 $Me_2CO_3 \cdot 3\ H_2O_2$ (Me=alkali metal, for example Na, K, Rb, Cs, especially Na). They are also referred to as alkali metal percarbonates and are commercially available. Economically and ecologically, sodium carbonate peroxyhydrate has been found to be particularly suitable for immediately increasing low oxygen levels in a waterbody.

In certain embodiments, the composition comprising at least one alkaline earth metal peroxide additionally comprises at least one alkali metal carbonate peroxyhydrate, especially $Na_2CO_3 \times H_2O_2$, preferably 2 $Na_2CO_3 \cdot 3\ H_2O_2$, or a mixture of $Na_2CO_3$ and $H_2O_2$. In certain embodiments, the methods according to the invention further comprise introducing and/or applying at least one alkali metal carbonate peroxyhydrate, especially $Na_2CO_3 \times H_2O_2$, preferably 2 $Na_2CO_3 \cdot 3\ H_2O_2$, or a mixture of $Na_2CO_3$ and $H_2O_2$.

The alkaline earth metal peroxides and alkali metal carbonate peroxyhydrates are preferably used in proportions of 1:1 to 1:0.03.

An increase in phosphate precipitation can be achieved if lanthanum ions are added to the system to be treated. This combination is particularly useful if phosphate precipitation to reduce eutrophication is indicated anyway. Lanthanum in the active sediment barrier decreases the efflux of phosphorus from the sediment when it becomes reducing again after the $CaO_2$ treatment.

In certain embodiments, to carry out the method according to the invention, the substances used, i.e., alkaline earth metal peroxides and optionally alkali metal carbonate peroxyhydrates and also other optional constituents, are added in an amount of 2 to 700, preferably 4 to 500, especially 5 to 300, particularly preferably 10 to 150 g/m² of water surface. In the case of sediment and/or sludge treatment, the usually higher amount of oxidizable substances means that the addition of the substances used according to the invention can be many times the amount to be added to the waters. In these cases, repeated application can be carried out.

Using this new method, it is additionally possible to lower heavy metal levels and the levels of disruptive anions, for example $NO_2^-$, $S^{2-}$, $NH_4^+$, etc.

Since the thus effected detoxification of the pore water allows normal development of the other organisms in the suboxic and oxygen-containing sediment zones, vitalization of all sediment zones above the active space of the cable bacteria additionally occurs as a synergistic effect.

The at least one alkaline earth metal peroxide used according to the invention and other components optionally used can be added to the systems to be treated either as individual substances or in a mixture with other substances in a solid body, aqueous solutions or aqueous slurries.

Silicates, such as phyllosilicates or tectosilicates, preferably from the group of zeolites and bentonites, are particularly suitable as such solid bodies. For practical reasons, it is particularly useful to compact the materials present in solid form and to use them, for example, as granules, pellets or tablets. In certain embodiments, the composition comprising at least one alkaline earth metal peroxide therefore additionally comprises at least one silicate, such as phyllosilicates or tectosilicates, preferably from the group of zeolites and bentonites.

Depending on the water quality and sediment quality, such as carbonate content, pH, etc., it may be appropriate to add yet further compounds which increase the water quality and/or sediment quality. Examples of such compounds include $Ca(OH)_2$, $CaO$, $CaCO_3$, $CaCl_2$, $Ca(NO_3)_2$, $CaSO_4$, $MgSO_4$, $Ca_2SiO_4$, further analogous magnesium compounds, and mixtures of the above. Depending on the condition of the raw water, it may be necessary to treat the water using alkali metal or alkaline earth metal salts, especially oxides, hydroxides, carbonates and/or hydrogencarbonates, for example in order to control the pH.

In certain embodiments, the compounds used according to the invention are in combination with a mixture of $CaCO_3$, $CaCl_2$) and/or $Ca(NO_3)_2$ and optionally magnesium salts, and $NaHCO_3$ and optionally $KHCO_3$, wherein $CaCO_3$ and $CaCl_2$) and/or $Ca(NO_3)_2$ and optionally magnesium salts are present in a molar ratio of 0.01:1 to 2:1 and $CaCl_2$) and/or $Ca(NO_3)_2$ and optionally magnesium salts and $NaHCO_3$ and optionally $KHCO_3$ are present in a molar ratio of 1:3 to 2:1. Such a mixture and its suitability for treating waters and sediments is, for example, described in the European patent application EP 737 169. In certain embodiments, the composition comprising at least one alkaline earth metal peroxide is additionally used with a mixture of $CaCO_3$, $CaCl_2$) and/or $Ca(NO_3)_2$ and optionally magnesium salts, and $NaHCO_3$ and optionally $KHCO_3$, wherein $CaCO_3$ and $CaCl_2$) and/or $Ca(NO_3)_2$ and optionally magnesium salts are present in a molar ratio of 0.01:1 to 2:1 and $CaCl_2$) and/or $Ca(NO_3)_2$ and optionally magnesium salts and $NaHCO_3$ and optionally $KHCO_3$ are present in a molar ratio of 1:3 to 2:1.

The presence of salts, for example of iron and/or aluminum, and/or of oxides, hydroxides, hydrogencarbonates, carbonates, sulfates, nitrates, chloride and/or fluoride can support the effectiveness of the method. The effectiveness can be improved especially by doping the metals iron and/or aluminum and/or lanthanum into compounds, said compounds being used in such an amount that the water quality is not adversely affected (dependent, for example, on preliminary testing of the water quality). In certain embodiments, iron ions and/or aluminum ions and/or lanthanum ions are thus additionally introduced, for example also in the composition comprising at least one alkaline earth metal peroxide.

The methods according to the invention can be used for treatment of waterbody sediments, sludges and/or water/ wastewater in open and closed water-containing systems, waterbodies such as seawater, brackish water and fresh water, for example in reservoirs, artificial or natural lakes, bathing or fishing waters, ornamental ponds and fishkeeping, additionally in process waters, for example sewage treatment plants, wastewater treatment plants, recycling plants, cooling water plants and heat exchanger plants, wastewaters of chemical production plants, or in the treatment of water arising from decomposition and condensation processes (e.g., landfill leachate or condensate from thermal waste processing plants) or from leaching processes (e.g., water seeping through contaminated soils, waterbody sediments or sludges).

The methods according to the invention can be carried out by direct metered addition of the components by hand and/or by technical devices or aids such as metering systems. The material can be directly metered into the water, sludge and/or sediment to be treated, and/or also by containers containing the material in solid form and the water to be treated flowing through them, for example filter cartridges, fixed bed reactors or fluidized bed reactors.

Further disclosed is a kit comprising a composition comprising at least one alkaline earth metal peroxide, and cable bacteria.

Here, the composition comprising at least one alkaline earth metal peroxide and the cable bacteria are the same as in the methods according to the invention, and so it is here referred to the relevant passages in the discussion of the methods according to the invention. In the kit, the composition comprising at least one alkaline earth metal peroxide and the cable bacteria can be present separately, or the cable bacteria can be included in the composition comprising at least one alkaline earth metal peroxide. Further possible components of the kit are mentioned above in connection with the methods according to the invention.

The kit according to the invention can be used especially in the methods according to the invention. Accordingly, such a use of the kit is also disclosed.

Additionally disclosed is the use of a composition comprising at least one alkaline earth metal peroxide in combination with cable bacteria for treatment of waters, sediments and/or sludges. Here too, the composition comprising at least one alkaline earth metal peroxide and the cable bacteria are as mentioned above in connection with the methods according to the invention, and here too, the composition comprising at least one alkaline earth metal peroxide and the cable bacteria can be used separately or together.

Further disclosed is the use of a composition comprising at least one alkaline earth metal peroxide in combination with cable bacteria for promotion of the development of aquatic plants. Here, the aquatic plants are not subject to any particular limitation, but are preferably those which cannot thrive in suboxic or anoxic environments.

Also disclosed is the use of a composition comprising at least one alkaline earth metal peroxide in combination with cable bacteria for waterbody restoration.

The present invention further provides for the use of a composition comprising at least one alkaline earth metal peroxide in combination with cable bacteria for sludge degradation in the restoration of water reservoir capacity. This is particularly important for said waterbodies.

Also disclosed is the use of a composition comprising at least one alkaline earth metal peroxide in combination with cable bacteria for detoxification of a biocenosis in a sediment and/or in sludge. Here, the toxins and harmful environments described above and below can be degraded.

Further disclosed is the use of alkaline earth metal peroxide, especially calcium peroxide, or mixtures comprising alkaline earth metal peroxide, especially calcium peroxide, as a solid electron acceptor for temporary establishment of a sediment biocenosis including cable bacteria, for example as occurs in undisturbed waterbodies. It is thus possible to establish or introduce "artificial" biocenoses which can lead to the restoration of a natural environment in a waterbody, sludge or sediment.

The above embodiments and developments can be combined with one another as desired, where this makes sense. Further possible embodiments, developments and implementations of the invention also encompass combinations of features of the invention that are described above or below with regard to the exemplary embodiments, which combinations are not explicitly mentioned. In particular, a person skilled in the art will also add individual aspects as improvements or additions to the particular basic form of the present invention.

The invention will be explained in further detail below with reference to various examples thereof. However, the invention is not limited to these examples.

EXAMPLES

Five different waterbodies containing waterbody sediments were treated with a composition comprising calcium peroxide, and increased effectiveness was observed in three waterbodies. Here, cable bacteria were found in the sediment samples from the three waterbodies, whereas no cable bacteria were found in the other two waterbodies. The cable bacteria were detected here by means of FISH using specific fluorescent labels for the cable bacteria.

What was demonstrated was that an unexpectedly high degradation effect of $CaO_2$ can be registered with cable bacteria in waterbody sediments. In the waterbody Kleiner Rußweiher in Eschenbach, $CaO_2$ was, for example, applied to 17 ha in a low dose, after a higher dose showed no appreciable effect in previous years. Using 450 kg/ha of a composition which corresponded to 150 kg of $CaO_2$/ha of water surface, a sludge volume of 2200 m$^3$ of sludge was degraded per hectare. Here, a layer of sludge of approx. 22 cm was removed over a period of 5 months. It was found that, with this measure, phosphorus was predominantly bound to iron in the remaining sediment. It was found that, surprisingly, the mass of organic sludge that is degraded in the presence of cable bacteria is many times higher than would be expected from the stoichiometry.

There is therefore a synergistically enhanced formation of an upper sediment barrier for phosphorus as a result of active mobilization of $Fe^2$ that diffuses toward the water/sediment interface and is oxidized to $Fe^3$ there or on the way there. $Fe^3$ is a natural binding partner for phosphate. It can be assumed here that the phosphorus barrier is generated by the iron ions which can be released, for example, from the sediments of iron sulfide or iron sulfite after oxidation by the cable bacteria. Here, the cable bacteria continue to make use of the oxygen introduced by the calcium peroxide and/or other electron acceptors provided thereby for the redox reaction.

The increase in iron-bound phosphates in the sediment was substantiated by sediment tests.

It was also found that, in the waterbodies containing cable bacteria, there was only an initial increase in oxygen or even a decrease in the oxygen concentration in the water column after the administration of calcium peroxide. Here, this is evidence that the cable bacteria use the oxygen from the water column as well after the $O_2$-free layer of water above the upper edge of the sediment has been eliminated by $CaO_2$. Normally, and in the absence of cable bacteria, there is an increase in oxygen concentration through diffusion. By contrast, the projects without cable bacteria exhibited a rise in $O_2$ concentration in the water column, which is also to be expected from a diffusion-controlled point of view.

The P-binding property of $CaO_2$, according to patent EP 1080042 A1, does not play a role in this method.

Use was made of tablets, because they can be applied with precision, and/or of granules or powders, which are preferably metered as a suspension, because this is the only way to realize a uniform distribution under water. What is important is an application proportional to the area.

The presence of cable bacteria typically leads to an increase in the water content of the treated sediments, to a reduction in the organic fraction, which can be measured as loss on ignition or TOC (total organic carbon), to an increased iron-P content in the P fractions of the sediment, and to increased mass transport of oxygen from the waterbody to/into the sediment surface.

An increase in macrophyte vegetation can then be registered in treated lakes containing cable bacteria. Accordingly, the method is suitable for repopulating aquatic plants in eutrophic waterbodies.

The cable bacterium detoxifies (sulfide) in methods according to the invention, allowing macrophyte vegetation, it mobilizes Fe-II, resulting in a P barrier below the layer of $CaO_2$, and it bypasses the principle of competition and thus eliminates itself from the competition for electron acceptors. $CaO_2$ alone has a limited effect, and cable bacteria alone do not obtain an electron acceptor. Both simultaneously have a reinforcing effect in each direction.

The invention claimed is:

1. A method for treating waters, sediments and/or sludges, comprising:
   (a) introducing and/or applying a composition comprising at least one alkaline earth metal peroxide into and/or to the waters, sediments and/or sludges; and
   (b) introducing cable bacteria into the waters, sediments and/or sludges.

2. The method as claimed in claim 1, wherein the alkaline earth metal peroxide used is a peroxide of calcium, a peroxide of magnesium or a mixture thereof.

3. The method as claimed in claim 1, wherein the composition comprising at least one alkaline earth metal peroxide additionally comprises at least one alkaline earth metal carbonate and/or at least one alkaline earth metal hydroxide and/or one alkaline earth metal sulfate.

4. The method as claimed in claim 1, wherein the composition comprising at least one alkaline earth metal peroxide additionally comprises at least one alkali metal carbonate peroxyhydrate, or a mixture of $Na_2CO_3$ and $H_2O_2$, or further comprising introducing and/or applying at least one alkali metal carbonate peroxyhydrate, or a mixture of $Na_2CO_3$ and $H_2O_2$.

5. The method as claimed in claim 1, wherein the composition comprising at least one alkaline earth metal peroxide is additionally used with a mixture of $CaCO_3$, $CaCl_2$) and/or $Ca(NO_3)_2$, and $NaHCO_3$, wherein $CaCO_3$ and $CaCl_2$) and/or $Ca(NO_3)_2$ and are present in a molar ratio of 0.01:1 to 2:1 and $CaCl_2$) and/or $Ca(NO_3)_2$ and $NaHCO_3$ are present in a molar ratio of 1:3 to 2:1.

6. The method as claimed in claim 1, wherein the composition comprising at least one alkaline earth metal peroxide additionally comprises at least one silicate.

7. The method as claimed in claim 1, wherein iron ions and/or aluminum ions, fluoride ions and/or lanthanum ions are additionally introduced and/or applied.

8. The method as claimed in claim 1, wherein the composition comprising at least one alkaline earth metal peroxide is introduced into the water, the sludge and/or the sediment and/or applied to the water, the sludge and/or the sediment directly, in solid form or as an aqueous slurry or solution, by hand or by suitable metering systems.

9. The method as claimed in claim 1, wherein the composition comprising at least one alkaline earth metal peroxide is present in solid form and the water to be treated flows around it.

10. The method as claimed in claim 1, wherein the composition comprising at least one alkaline earth metal peroxide is incorporated into the sediment and/or the sludge by positive mixers, rotary tillers or other mechanical metering systems and/or methods.

11. A method for treating waters, sediments and/or sludges, comprising:
   (i) testing the waters, sediments and/or sludges for the presence of cable bacteria; and
   (ii-a) introducing and/or applying a composition comprising at least one alkaline earth metal peroxide into and/or to the waters, sediments and/or sludges, and introducing cable bacteria into the waters, sediments and/or sludges if no or essentially no cable bacteria were found during the testing of the waters, sediments and/or sludges; or
   (ii-b) introducing and/or applying a composition comprising at least one alkaline earth metal peroxide into and/or to the waters, sediments and/or sludges if cable bacteria were found during the testing of the waters, sediments and/or sludges.

12. The method as claimed in claim 11, wherein the alkaline earth metal peroxide used is a peroxide of calcium, a peroxide of magnesium or a mixture thereof.

13. The method as claimed in claim 11, wherein the composition comprising at least one alkaline earth metal peroxide additionally comprises at least one alkaline earth metal carbonate and/or at least one alkaline earth metal hydroxide and/or one alkaline earth metal sulfate.

14. The method as claimed in claim 11, wherein the composition comprising at least one alkaline earth metal peroxide additionally comprises at least one alkali metal carbonate peroxyhydrate, or a mixture of $Na_2CO_3$ and $H_2O_2$, or further comprising introducing and/or applying at least one alkali metal carbonate peroxyhydrate, or a mixture of $Na_2CO_3$ and $H_2O_2$.

15. The method as claimed in claim 11, wherein the composition comprising at least one alkaline earth metal peroxide is additionally used with a mixture of $CaCO_3$, $CaCl_2$) and/or $Ca(NO_3)_2$, and $NaHCO_3$, wherein $CaCO_3$ and $CaCl_2$) and/or $Ca(NO_3)_2$ and are present in a molar ratio of 0.01:1 to 2:1 and $CaCl_2$) and/or $Ca(NO_3)_2$ and $NaHCO_3$ are present in a molar ratio of 1:3 to 2:1.

16. The method as claimed in claim 11, wherein the composition comprising at least one alkaline earth metal peroxide additionally comprises at least one silicate.

17. The method as claimed in claim 11, wherein iron ions and/or aluminum ions, fluoride ions and/or lanthanum ions are additionally introduced and/or applied.

18. The method as claimed in claim 11, wherein the composition comprising at least one alkaline earth metal peroxide is introduced into the water, the sludge and/or the sediment and/or applied to the water, the sludge and/or the sediment directly, in solid form or as an aqueous slurry or solution, by hand or by suitable metering systems.

19. The method as claimed in claim 11, wherein the composition comprising at least one alkaline earth metal peroxide is present in solid form and the water to be treated flows around it.

20. The method as claimed in claim 11, wherein the composition comprising at least one alkaline earth metal peroxide is incorporated into the sediment and/or the sludge by positive mixers, rotary tillers or other mechanical metering systems and/or methods.

\* \* \* \* \*